United States Patent [19]
Freeburg et al.

[11] Patent Number: 5,940,381
[45] Date of Patent: Aug. 17, 1999

[54] ASYNCHRONOUS TRANSFER MODE RADIO COMMUNICATIONS SYSTEM WITH HANDOFF AND METHOD OF OPERATION

[75] Inventors: Thomas A. Freeburg, Arlington Heights, Ill.; Daniel B. Grossman, Norwood, Mass.; Paul Odlyzko, Arlington Heights, Ill.

[73] Assignee: Motorola, Inc., Schaumburg, Ill.

[21] Appl. No.: 08/615,381

[22] Filed: Mar. 14, 1996

[51] Int. Cl.[6] .............................. H04Q 7/00; H04L 12/28
[52] U.S. Cl. .......................................... 370/331; 370/395
[58] Field of Search .................................. 370/312, 347, 370/349, 360, 328, 329, 331, 338, 395–399; 455/436, 439, 442

[56] References Cited

U.S. PATENT DOCUMENTS

| | | | |
|---|---|---|---|
| 5,434,853 | 7/1995 | Hemmady et al. | 370/331 |
| 5,434,859 | 7/1995 | Levardon . | |
| 5,590,125 | 12/1996 | Acampora et al. | 370/329 |

FOREIGN PATENT DOCUMENTS

| | | |
|---|---|---|
| 0577322 | 1/1994 | European Pat. Off. . |
| 0679042 | 10/1995 | European Pat. Off. . |
| WO 94/28645 | 12/1994 | WIPO . |
| WO 95/32594 | 11/1995 | WIPO . |

Primary Examiner—Huy D. Vu
Assistant Examiner—Chiho Andrew Lee
Attorney, Agent, or Firm—Kenneth A. Haas

[57] ABSTRACT

A radio communications system (10) having a mobile station (30) and at least two base stations (13, 14). ATM radio channels (31, 32) are provided between the remote station and base stations. Each of the ATM channels supports communication though ATM cells over a common frequency band. At least one ATM node (21) is coupled to the base stations. A base station controller (11) is coupled to the ATM node. The base station controller has a combiner (303) for combining cell streams received from the first and second base stations and an ATM signalling circuit (330) for sending ATM commands to the ATM node for dividing cell streams at the ATM node to the first and second base stations. The remote station (30) has a logic unit (520) for combining cell streams received from the first and second base stations during a handoff from the first base station to the second base station.

5 Claims, 11 Drawing Sheets

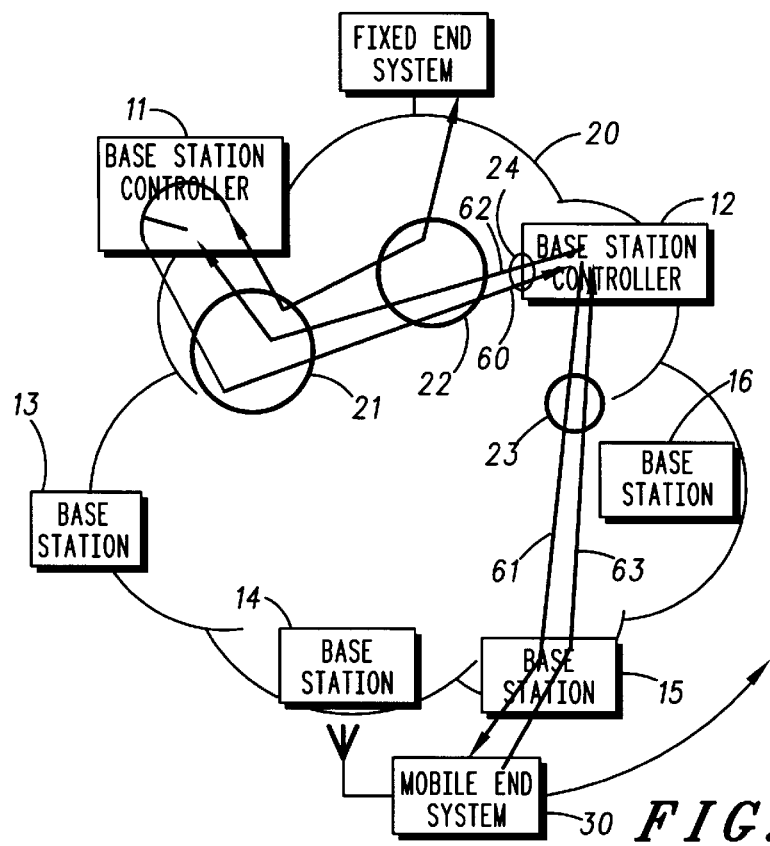
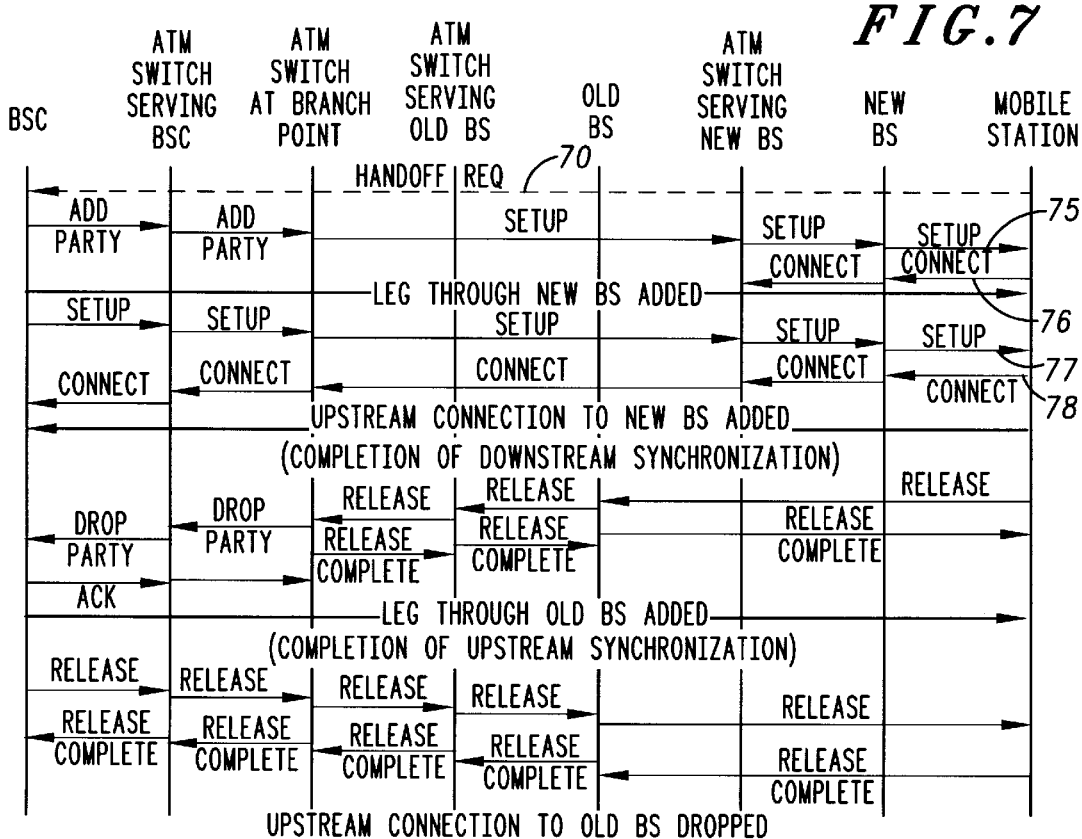
FIG. 6
FIG. 7

5,940,381

ASYNCHRONOUS TRANSFER MODE RADIO COMMUNICATIONS SYSTEM WITH HANDOFF AND METHOD OF OPERATION

FIELD OF THE INVENTION

This invention relates to a wireless communications system utilizing asynchronous transfer mode (ATM communications) and it relates to remote station (generically referred to as a 'mobile station' though not necessarily mobile) for operation in such a system and, separately, a base station controller and a method of operation.

BACKGROUND OF THE INVENTION

In the modern telecommunications world, voice communications continue to be a popular mode of communication, but new services like video telephony, high speed data and short message services continue to expand on existing services. The arrival of new telecommunications services generates new requirements for telecommunications networks. New telecommunications techniques (transfer modes) are required and offer possible advantages compared to existing techniques. Traditional transfer modes for wired communications are circuit switching, familiar in classical telephone services, and packet switching, familiar in telegraphy and modern short message service and data systems.

Asynchronous transfer mode (ATM) is a mode of fast packet switching which allows systems to operate at a much higher rate than traditional packet switching systems. Features which characterize ATM communications are: the ability for asynchronous operations between a sender clock and a receiver clock; transmission "cells" of pre-defined sizes; and addressing carried out in a fixed size header (that is not but time, frame position or other fixed characteristic). ATM communication is sometimes also referred to as asynchronous time division (ATD) communications.

Asynchronous transfer mode (ATM) is a mode of fast packet switching which facilitates switching systems that operate at a much higher rate than traditional packet switching systems. Features which characterize ATM communications are: the ability for asynchronous operations between a sender clock and a receiver clock; the concept of a "virtual connection" which is established for the lifetime of an information flow that comprises part or all of the communication; transmission "cells" of a fixed, standardized size; and connection identification carried in a fixed size header (that is not by time, frame position or other fixed characteristic). ATM communication is sometimes also referred to as asynchronous time division (ATD) communications. Other features of ATM communications are notions of a "service category", "traffic contract" and Quality of Service objectives that apply to the virtual connection. The expression "virtual connection" here is used to refer a virtual path and virtual circuit pair and "virtual connection identifier" means either a virtual path identifier (VPI) or a virtual circuit identifier (VCI) or both.

ATM communication has proven useful in high-value point-to-point land-line communication, for example, satellite links and undersea cables. ATM allows multiple simultaneous circuits, sometimes referred to as virtual circuits (VCs), to be established from end to end along the link.

European Patent No. EP0679042 of Roke Manor Research describes a mobile communications network with ATM as the transfer mode used in the switching infrastructure and describes steps to be taken in the mobile network switching infrastructure when a mobile terminal changes affiliation from one base station to another base station, as in a conventional handoff operation and when a mobile terminal communicates simultaneously through more than one base station. The transfer mode of the radio link is not described. International Patent Application No. WO94/28645 of The Trustees of Columbia University in the City of New York also addresses the use of ATM in a mobile communications system switching network and addresses distributed call set-up and rerouting in a mobile ATM based system with ATM switches.

A mobile communications network consists of a number of mobile end systems, a number of base stations, and a number of base station controllers, where the base stations and base station controllers are interconnected using an Asynchronous Transfer Mode (ATM) network. When a mobile end system moves from radio site (or "cell" or "zone") to another, it is necessary to execute a handoff between the corresponding base stations.

The standardized ATM architecture prohibits any ATM network (including a wireless ATM network) from misordering or duplicating ATM user data cells. In general, ATM networks should lose (i.e. by discarding) few, or preferably no, ATM user data cells at any time, including during handoff. Further, the ATM service architecture distinguishes between 'real time' and 'non-real time' service categories. In real time service categories, cell delay variation (CDV—the variability in the pattern of cell arrival events at the output of an ATM connection relative to the pattern of corresponding events observed at the input of the connection) is an element of quality of service. CDV is negotiated between the end systems (including mobile end systems) and the network (s). If a cell exceeds the agreed CDV, then it either is lost, or becomes useless to the end system when it is delivered; thus, a late cell is treated as if it were lost. Non-real time services are indifferent to CDV, but may be more sensitive to cell discard.

The arrangements described in the above prior art patent application are not optimal in their use of ATM resources in an access network, nor do those arrangements address communication using ATM as the transfer mode over-the-air.

International Patent Application No. WO94/32594 of NTT Mobile Communication Network, Inc. describes a cellular mobile radio communication system soft-handover scheme using code division multiple access (CDMA) where signals transmitted from different base stations are spread with different spread codes and simultaneously received at a mobile station with reception units in correspondence to different base stations. It is described how communication can take place in packets which include a call number, in case the mobile station deals with a plurality of calls, a sequence number and an identification number (ID) for the mobile station. It is explained how the same packet can be received at the mobile station from more than one base station or received at more than one base station from the same mobile station, to provide a reliable diversity handover scheme. The establishment of simultaneous communication through two base stations is described, without the completion of a handover process being described. It must be assumed that the completion of handover complies with pre-existing CDMA soft handover principals. The patent application also mentions that the packet communication scheme can be an ATM scheme.

Attention is turning to the use of ATM for the radio interface transfer mode of wireless communications. There is, for example, a need for wireless users to have access to wired ATM networks and existing ATM systems such as multi-media applications need a wireless platform providing multi-media support. It is also recognized that systems such as universal mobile telephone systems (UMTS) and existing wireless local area networks (LANs) cannot meet all future data user needs. Efforts to date have been in the use of ATM in the wireless extension of fixed infrastructure systems, such as locan area networks (LANs) and integrated service data network (ISDN).

For private land mobile networks and cellular radio networks, circuit-switched frequency-division multiple access (FDMA) with or without time division multiple access (TDMA), as well as code division multiple access (CDMA) continue to be the available multiple access schemes for the radio interface. Each of these multiple access schemes has its advantages and disadvantages in different circumstances and the various schemes are generally incompatible with each other.

A mobile radio system is now envisaged using ATM as the transfer mode and using a novel multiple access scheme which has advantages over existing FDMA, TDMA and CDMA multiple access schemes. There is a need for a method of handover in such a novel system.

Glossary of Terms

ATM Asynchronous Transfer Mode
BS Base station
BSC Base station controller
CDV Cell Delay Variation
CLP Cell Loss Priority
GFC Generic Flow Control
HEC Header Error Control
PTI Payload Type Identifier
VPI Virtual Path Identifier
VCI Virtual Circuit Identifier

BRIEF DESCRIPTION OF THE DRAWINGS

FIGS. 2 through 6 are further block diagrams of the network of FIG. 1 showing a sequence of connection configurations.

FIG. 7 is a ladder diagram showing an exchange of signalling messages for a base station to base station handoff.

DETAILED DESCRIPTION OF THE DRAWINGS

Figure 1:
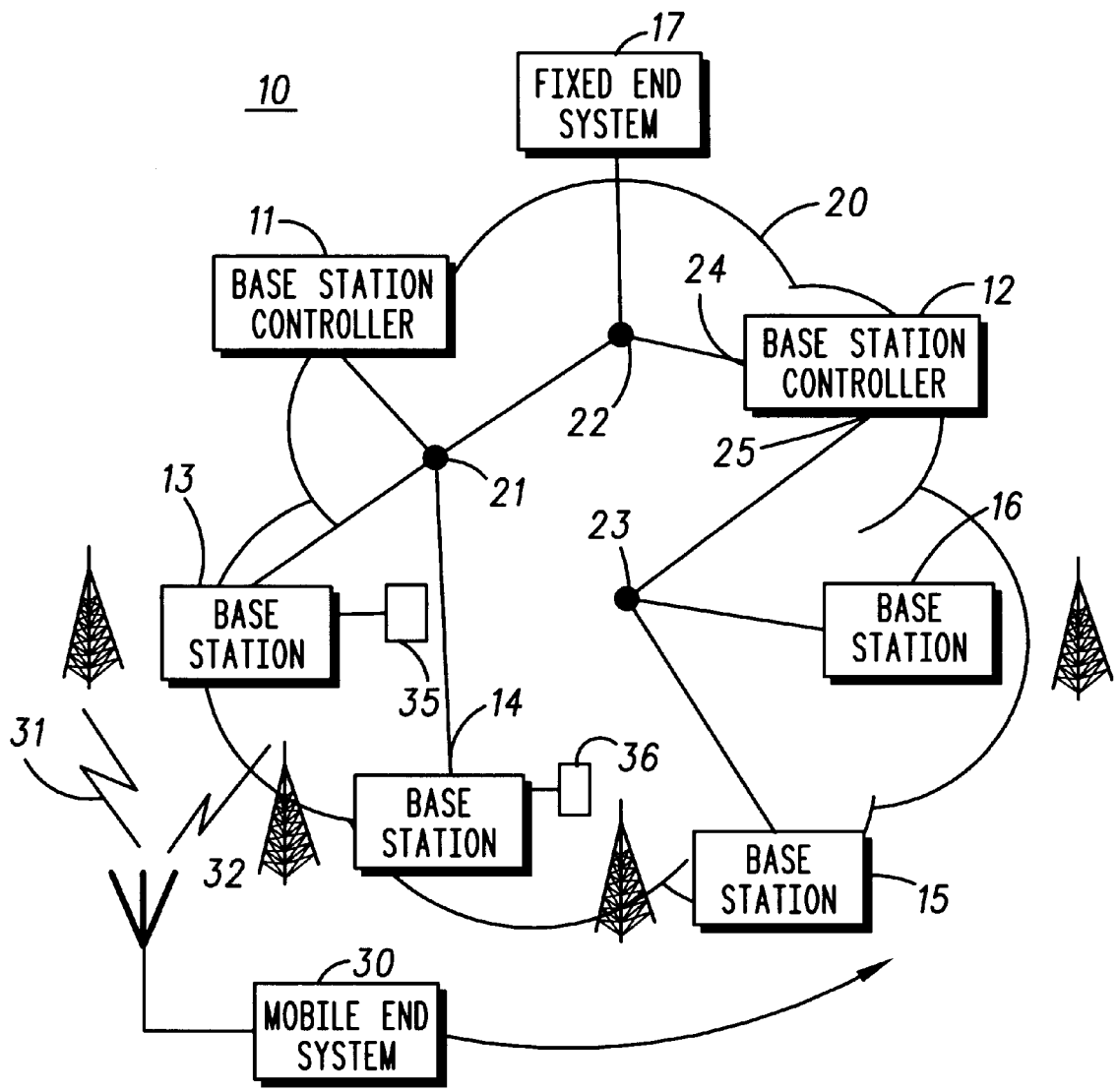
FIG. 1 is a block diagram of a mobile radio network.

FIG. 1 shows a radio communications system 10, which comprises a number of base station controllers (BSCs) of which two are shown as BSCs 11 and 12, each controlling a number of base stations (BSs) 13,14,15 and 16 by way of example. Each BSCs, e.g. BSC 11 communicates with associated base stations 13 and 14, with one or more fixed ATM end systems 17 and with other BSCs, e.g. BSC 12, by means of a fixed ATM network 20, which is implemented using existing standards and implementation agreements. The fixed ATM network 20 is comprised of a mesh of interconnected ATM nodes, of which three (nodes 21, 22 and 23) are shown in FIG. 1 by way of example.

Node 21 is connected to BSC 11 and BSs 13 and 14 and to node 22. Node 22 is connected to BSC 12, via a first port 24 of BSC 12, and fixed to end system 17. Node 23 is coupled to BSC 12 via a second port 25 of BSC 12 and is coupled to BSs 15 and 16. Thus different configurations are possible and a node, e.g. node 21, can pass downstream traffic from the fixed end system 17 to the BSC 11 and from the BSC 11 to a BS 13 2 0 while simultaneously passing upstream traffic from a BS 13 to the BSC 11 and from the BSC 11 to the fixed end system 17. Alternatively, a BSC, e.g. BSC 12 can effectively divide the network into a sub-network on the mobile side and a sub-network on the fixed side.

In a real system, there will be many more nodes in the network 20 and any given link between the fixed end system and a base station via a BSC may pass through many nodes in sequence.

The network 10 further includes a number of mobile ATM end systems (alternatively "remote stations" and hereafter simply "mobile stations"), which communicate with the base stations by radio. One such mobile station 30 is shown by way of example. An object of end-to-end communication is the establishment of one or more ATM virtual connections between the mobile station 30 and one or more fixed end systems 17. The mobile end system moves during the lifetime of the ATM connection, moving from the radio cell covered by the first base station to the radio cell covered by the second base station and so on. First ATM radio channel 31 is provided between mobile station 30 and base station 13 and second ATM radio channel 32 is provided between mobile station 30 and base station 14. First and second ATM radio channels 31 and 32 support communication though ATM cells over a common frequency band and are described in more detail below. Base station 13 has a connection identifier memory 35 and base station 14 has a connection identifier memory 36.

As the mobile end system travels from radio cell to radio cell in the direction of the arrow, it is desirable that the connection segment between the old base station and the BSC (for inter-base station handoffs), as well as the connection segment between the new anchor BSC and the old BSC (for inter-BSC handoffs) be removed from the connection, so as to release resources and minimize fixed and variable delay. To the extent possible, it is desirable to use existing ATM standards and implementation agreements. In particular, mobile-specific modifications to the fixed ATM network should be avoided.

There is a trade-off to be made with regard to the use of ATM virtual paths (VPs). A VP is an aggregation of virtual circuits, which can be processed by an ATM VP switch as a group rather than individually. If all virtual circuit connections (VCCs) to a single mobile end system are aggregated into a single VP connection, handoffs can be executed on the aggregate, minimizing processing. However, the service category and quality-of-service provided for the VP are at least as stringent as those for the most sensitive VCC that uses the virtual path connection (VPC), and the traffic contract for the VPC is at least as large as the sum of the traffic contracts for all of the possible VCCs (noting that VCCs can be added after the VPC is established). This approach is more efficient in this respect than arrangements in the prior art.

Although the preferred embodiment of the present invention uses switched VCCs from the BSC to the BS, an alternative embodiment uses switched VPCs (i.e. established on demand using signalling). In this case, there is a VPC for each mobile device. The traffic contract is sufficient to handle only existing VCCs and some additional margin; it can be adjusted as needed during a handoff or by means of signalling renegotiation.

FIGS. 2 through 6 represent a sequence of connection configurations in the system of the preferred embodiment of the present invention, as the mobile end system moves. The heavy lines in each figure show the connection configuration.

Figure 2:
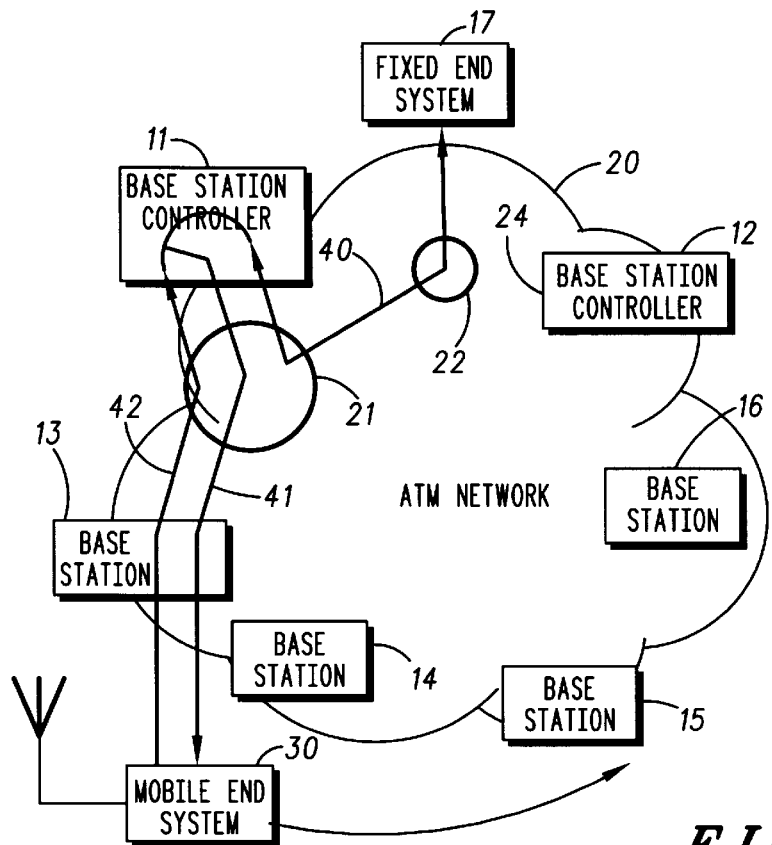

A BSC, e.g. BSC 11 in FIG. 2, is the endpoint of a point-to-point bidirectional virtual circuit connection (VCC) 40, where the other endpoint of the VCC is the fixed end system 17. Thus, BSC 11 appears to the ATM network 20 to be an end system. The BSC 11 is also an endpoint of two or more virtual connections, which may be VCCs or virtual path connections (VPCs). One of these virtual connections, which is designated the downstream virtual connection 41, is a unidirectional point-to-multipoint connection, having its root at the BSC 11, such that ATM cells flow from the BSC to all BSs that are presently joined to the downstream virtual connection. The other virtual connection, which is designated the upstream virtual connection 42, is a unidirectional point-to-point connection, such that ATM cells flow from a single base station 13 to the BSC 11. Point-to-point and point-to-multipoint unidirectional virtual connections and the means for signalling to obtain them are defined in the ATM standards. The BSC 11 splits the two directions of the connection between itself and the fixed end system by switching cells received from the fixed end system 17 to the downstream virtual connection 41 and by further switching cells received on the upstream virtual connection 42 towards the fixed end system.

FIG. 2 shows the initial configuration of ATM connections. An end-to-end communication has been established by means known in the art, including establishment of the upstream and downstream virtual connections, by means of standardized ATM signalling protocols. The downstream virtual connection 41 has only one leg, so is indistinguishable in the figure from a point-to-point connection. Thus, cells sent by the fixed ATM end system 17 are forwarded by the BSC 11 to the base station 13 serving the mobile station 30, and cells sent by the mobile station 30 are forwarded by the base station 13 to the BSC 11, and thence to the fixed end system 17.

Figure 3:
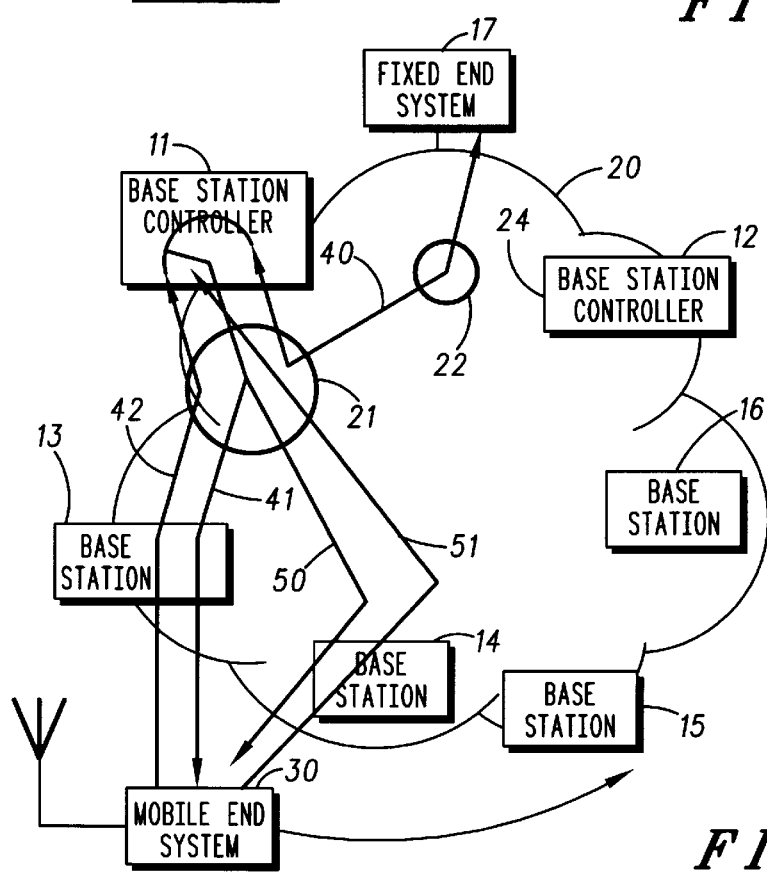

FIG. 3 shows the configuration of the ATM connections during a BS-BS handoff from the old base station 13 to a new base station 14. The BSC 11 has determined that the handoff is available or required. This determination may take one a number of forms. In the preferred embodiment the mobile station 30 reports signal strength and bit error rate measurements to the BSC 11 indicating the need for a handoff. Either the mobile station 30 reports to the BSC 11 the detection of synchronization cells (F3 cells) transmitted by base station 14 and identifying base station 14 or base station 14 reports to the BSC 11 the detection and reception of ATM cells from the mobile station 30.

The BSC 11 uses existing ATM call control signalling protocols to add a leg 50 to the downstream connection, having as its destination the new base station 14. It further uses the signalling protocols to establish an upstream connection 51 to the new base station 14. In the downstream virtual connection, the ATM network node 21 bifurcates the ATM cell stream into connections 41 and 50. This is achieved by the BSC 11 providing the node 21 with ATM signalling requesting the bifurcation.

Thus, in FIG. 3, the mobile station 30 is receiving two copies of the cell stream that originated in the fixed end system 17, and the BSC 11 is receiving two copies of the cell stream that originated in the mobile station 30. Initially, the mobile station and the BSC each discard cells received from the new base station 14, and continue to consume cells received from the old base station 13. After synchronization (described below with reference to FIGS. 8 and 9) is performed, the mobile end system and the BSC discard cells received from the old base station 13 and consume cells received from the new base station 14.

Figure 4:
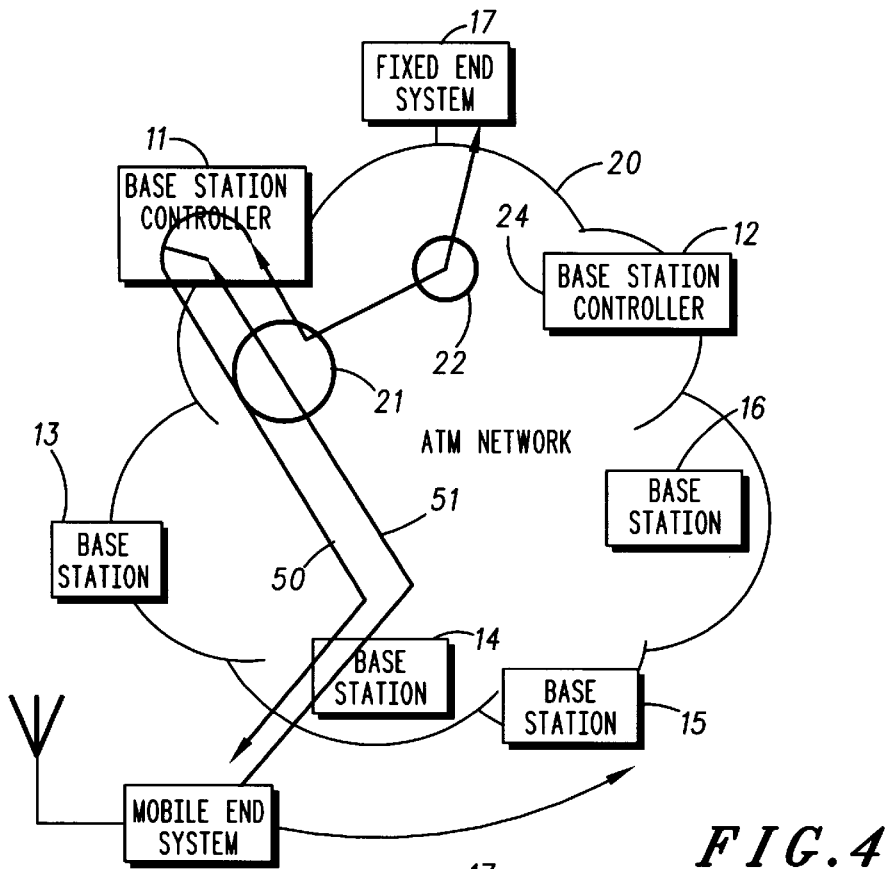

FIG. 4 shows the configuration of the ATM connections after the BS-BS handoff. After it has completed synchronization, the BSC uses the existing ATM call control protocol to release the old upstream connection 42. Similarly, after it has completed synchronization, the mobile station 30 drops the old leg of the downstream connection 42.

Figure 5:
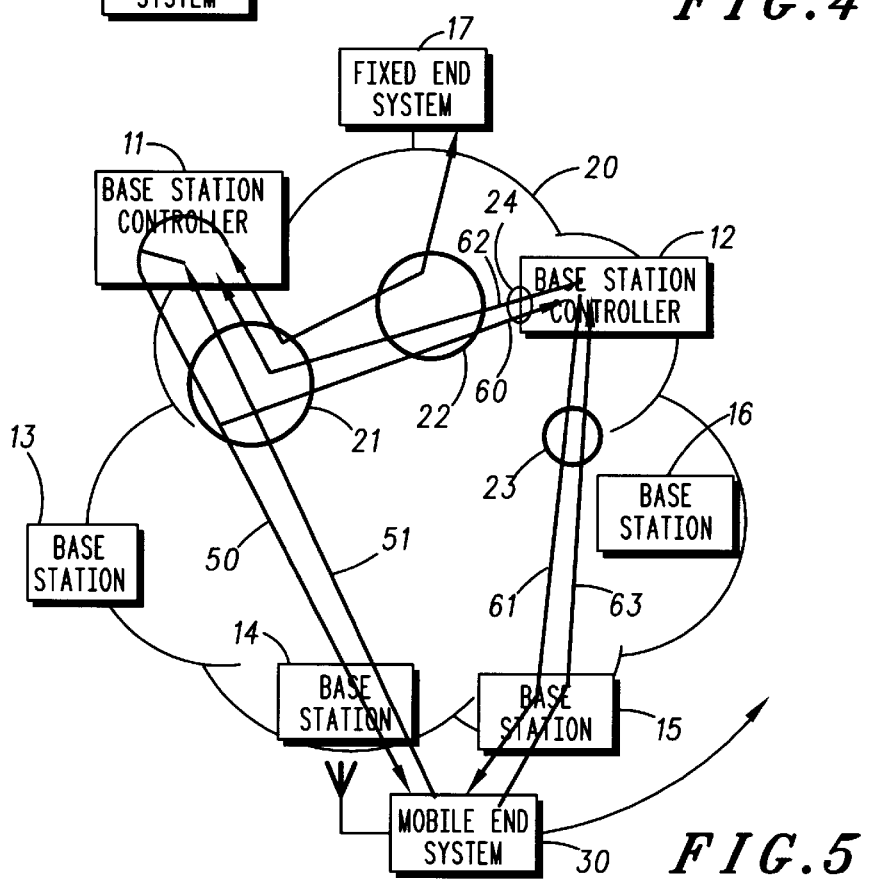

FIG. 5 shows the configuration of the ATM connections for a BSC-to-BSC handoff as mobile station 30 moves from the coverage area of BS 14 to the coverage area of base station 15 served by BSC 12. Mobile station 30 reports through base station 14 that it is receiving cells from base station 15 and optionally reports the signal strength and/or bit error rate of those cells. The preferred operation is that mobile station 30 passes these cells to BSC 11 and BSC 11 examines the error rate within the cells by performing error detection on the cells.

As a third alternative, base station 15 reports to BSC 12 via node 23 the detection and reception of ATM cells from mobile station and BSC identifies that BSC 11 is the BSC serving the mobile station and reports to BSC 11 that there is an opportunity for a handoff. BSC 12 identifies BSC 11 as the serving BSC either by interrogation of surrounding BSCs or by information reported to it periodically from surrounding BSCs as to the identification numbers of mobile station being served by the surrounding BSCs.

Node 21 (or some other node) is instructed by BSC 11 to bifurcate the downstream connection 50 and establish a connection 60 to BSC 12, where the connection is made through first port 24. BSC 12 in turn establishes a connection 61 through its other port 25 to base station 15 via node 23. BSC 12 then establishes an upstream connection 62 to BSC 11. BSC 11 combines the upstream connection 62 with the upstream connection 51 in a manner described below.

Finally, as shown in FIG. 6, BSC 11 instructs node 21 to drop downstream connection 50 and mobile station 30 drops the upstream connection 51.

FIG. 7 is a ladder diagram showing the exchange of signalling messages for a BS-BS handoff as shown in FIGS. 2, 3 and 4. The messages indicated by thin lines are standard ATM connection control signalling messages. The message 70 indicated by the dotted line is an additional messages sent between the BSC 11 and the mobile station 30. The vertical lines show elements of the connection configuration. Messages 75 and 76 are setup and connect messages for the downlink connection between the base station 14 and the mobile station 30. Messages 77 and 78 are setup and connect messages for the uplink connection between the base station 14 and the mobile station 30

In the process of ATM signalling to add or remove legs from connections, there is a correlation identifier which is part of the signalling message sent (by the mobile station or the BSC) to the network and transferred end-to-end. This identifier maps the VPI and VCI combinations between the connection for the old base station with the VPI and VCI combination for the connection to the new base station. Each of the set-up and add-party messages indicated by the thin lines in FIG. 7 carries this correlation identifier.

Reference is now made to the handoff process and the appropriate VPI and VCI selection in the downlink connection setup message 75 in FIG. 7 in which the base station 14 sends a setup message to the to the mobile station 30. The VPI is generally unique for the connection between the two end points and is selected by the base station 14. The VCI can be the same as for the cell stream from base station 13 to mobile station 30.

Mobile station 30 receives from BSC 11 a correlator identifier identifying that the new connection (having a new VPI and VCI) is the same as the existing connection through the old base station. Mobile station 30 is able to distinguish between the cell streams by virtue of the different VPI/PCI combinations. BSC 11 instructs mobile station 30 to initiate a handover to the new virtual connection identified by the correlation identifier and the new VPI/VCI combination.

It is preferred that across the whole network 20 the whole domain of VPI numbers, at least for downlink connections, is subdivided into mutually exclusive sub-groups of VPIs (or VPIs and VCIs) and that any given base station uses only its allocated sub-group of VPIs. These are stored in the connection identifer memory 35 or 36 for the base station. Adjacent base stations are, as far as practicable, not allocated the same subgroup of VPIs. This has an advantage similar to the reuse of frequencies in an FDMA system in that the VPI sub-groups are re-used across the network and confusion is avoided at the overlapping regions of base stations or the overlapping regions of networks. In one of the final steps of the handoff process, the VPI number may be changed to a new VPI number selected by the new base station. In this embodiment the VPI number is temporarily out of the sub-group of VPI numbers allocated to the base station and is chosen from within that sub-group when it is updated.

In operation, an ATM communication is established between the mobile station 30 and the old base station 13 with at least a first virtual connection identifier (preferably a VPI) selected from the connection identifier memory 35. When it is determined that handoff conditions are met for a handoff to the new base station 14, base station 14 selects a second virtual connection identifier (including a second virtual path identifier and a second virtual circuit identifier) for a downlink connection between the new base station and the mobile station. In the preferred method, the new base station 14 at least temporarily selects the existing virtual path identifier and the existing virtual circuit identifier as the new virtual path identifier and the new virtual circuit identifier for uplink communication. At least one of the second virtual path identifier and the second virtual circuit identifier (preferably the former) is later changed to a new value.

Thus the first base station 13 is provided with a first sub-group of virtual path identifiers in memory 35 for use in communications with the mobile station 30 and the second base station 14 is provided with a second sub-group of virtual path identifiers in memory 36 for use in communications with the mobile station 30, which is mutually exclusive to the first sub-group of virtual path identifiers, and the second virtual path identifier is (later, if not initially) selected by the base station from the second sub-group.

Each base station communicates with its mobile stations through ATM cells and each base station transmits physical layer synchronization cells using its own synchronization timing. ITU Rec. I.610 describes various types of cells including F3 cells and F5 cells.

Synchronization takes place in the physical layer using F3 cells and in the ATM layer using F5 cells.

In the physical layer, the physical radio channel is divided into frames. One frame comprises a fixed number of cells, there being preferably more than 10 and less than 50 cells per frame. Each Nth cell is a synchronization cell (where 10<N<50) which can be considered to be an F3 cell. Thus the frames received by the mobile station 30 from base station 13 may be offset from the frames received from base station 14. The offset is not necessarily a whole number of cells, but is entirely arbitrary. This is advantageous from a cell planning point of view. Operation takes place at a basic frame rate, with all transmissions being at integer multiples or devisors of the frame rate. A virtual connection comprises one or a plurality of cells per frame, depending on the desired data rate and the available capacity.

Each cell has a header (described below with reference to FIG. 12) identifying the VPI and the VCI. Cells with the same VPI and VCI are collected by the base station (in the uplink direction) or the mobile station (in the downlink direction) into blocks of cells. The first cell of each block is an ATM synchronization cell, which can be considered to be an F5 cell.

Figure 8:
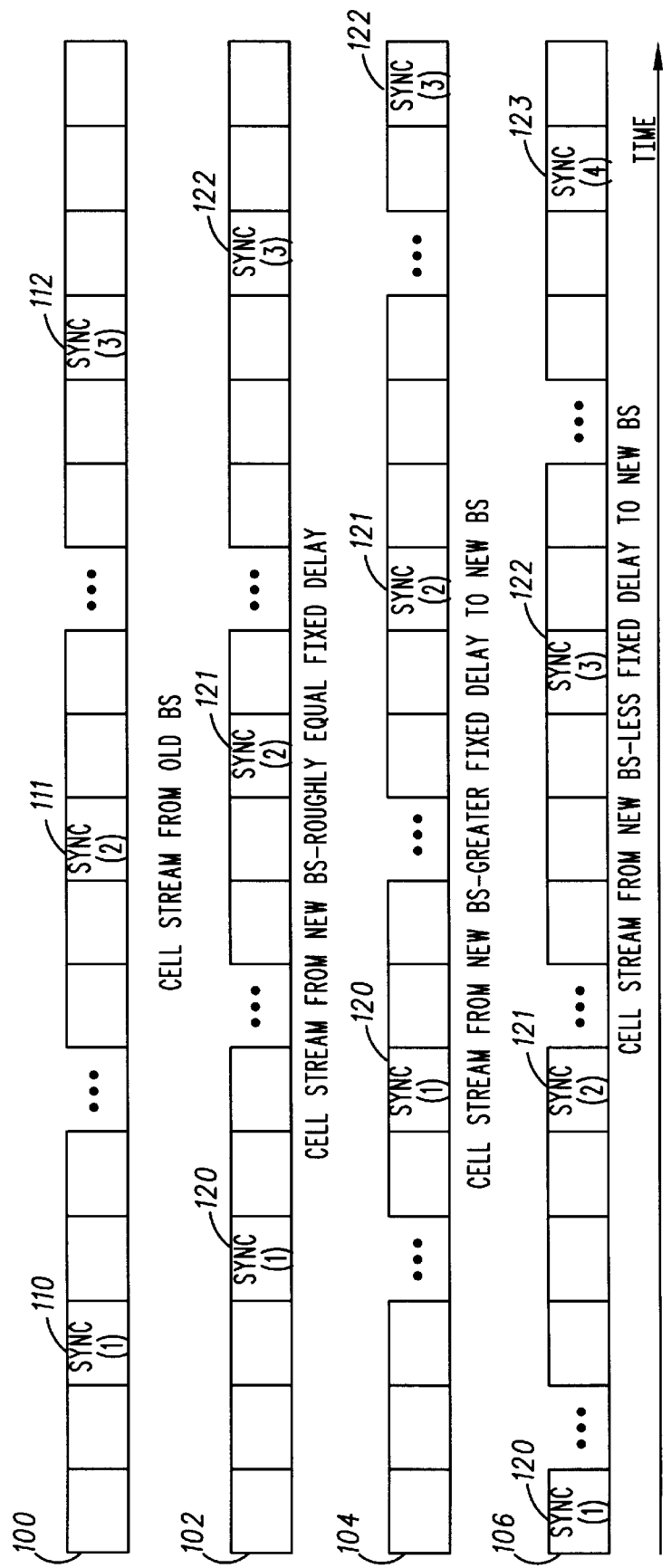
FIG. 8 is a time sequence diagram showing thee timing relationship of cell streams during different handover scenarios.

FIG. 8 is a time sequence diagram, showing the timing relationship for blocks of cells between the cell stream 100 from the old base station 13 and the cell stream 102 from the new base station 14 in scenarios where the fixed delay from the new base station is approximately the same as the fixed delay from the old base station. The figure also shows an alternative cell stream 104 from the new base station where the fixed delay from the new base station is greater than the fixed delay from the old base station and a further alternative cell stream 106 where the fixed delay from the new base station is less than the fixed delay from the old base station.

F3 synchronization cells 110, 111 and 112 are present in the cell stream from the old base station 13 at intervals of fixed numbers of cells, where the interval is known to the base station, mobile end systems and BSC. Synchronization cells 120, 121 and 122 are present in the cell stream from the new base station 13 at the same intervals. (In cell stream 106 a further synchronization cell 123 is shown.) In each case, the differential fixed delay is approximately equal to the difference in arrival times between a synchronization cell from the old BS and the corresponding cell from the new BS. Due to the effect of delay jitter and queuing delays, the exact difference is not known. In each case a splicing arrangement is needed to seamlessly end the cell stream 100 from the old base station and pick up the cell stream 102, 104 or 106 from the new base station without omitting or repeating cells.

Figure 9:
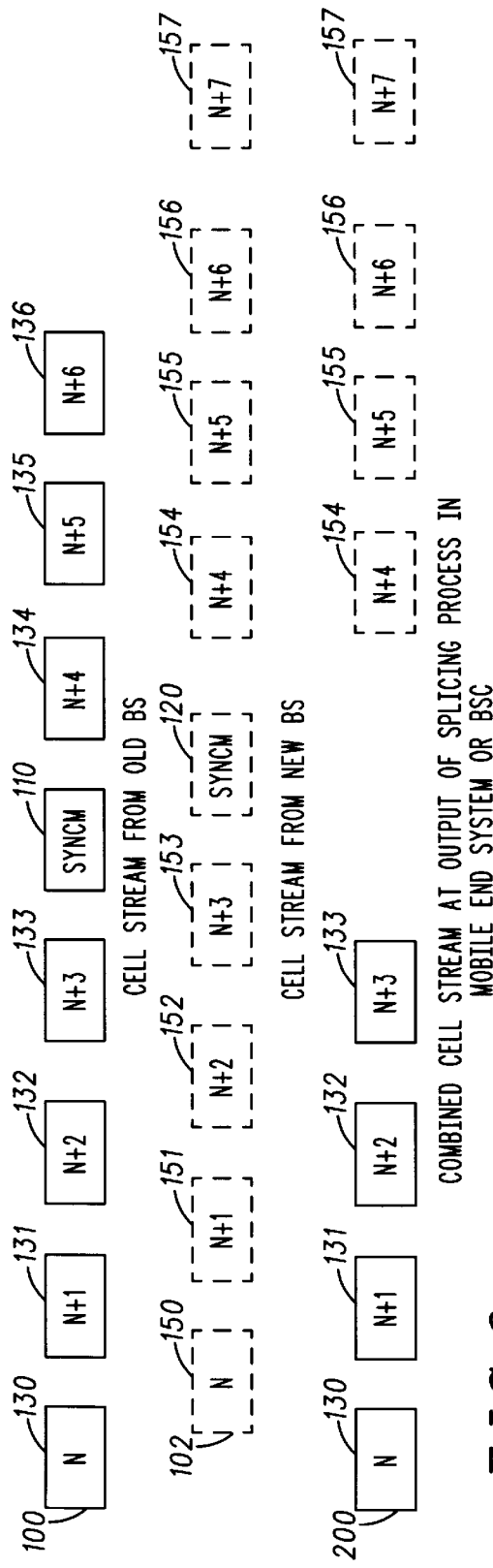
FIG. 9 is a time sequence diagram illustrating a splicing operation in a first scenario.

FIG. 9 is a time sequence diagram, showing the operation of the splicing process carried out in the mobile end system, where it acts upon the two legs 41 and 50 of the downstream virtual connections that arrive from the old base station and the new base station 13 and 14, respectively. The splicing process also occurs in the base station controller 11 (the 'anchor' BSC), where it acts upon the two upstream virtual connections 42 and 51 that arrive from the old base station and the new base station, respectively.

FIG. 9 shows the cell streams 100 received from the old base station, the cell stream 102 received from the new base station, and the cell stream 200 emerging from the splicing process, respectively. For illustration, cells received from the new base station are in phantom outline. User data cells 130, 131 etc. are designated sequentially (i.e., n, n+1, n+2, etc.), and F5 synchronization cells 110 are designated sequentially (i.e., $sync_m$, $sync_{m+1}$, etc.), where any cell so designated is identical whether received from the old base station or the new base station. At the beginning of the splicing process, user data cells n, n+1, n+2, n+3 received from the old base station become the output of the splicing process. The splicing process awaits synchronization cells. If synchronization cell 110 ($sync_m$) is received first from the old BS, then the splicing process discards subsequent user data cells 134, 135, 136 etc. (labelled n+4, n+5, etc) from the old BS, awaits the corresponding synchronization cell 120 ($sync_m$) from the new base station, discards the synchronization cell 120, and then the output of the synchronization process becomes user data cells 154, 155, 156, 157 etc. (labelled n+4, n+5, etc.), received from the new BS.

Figure 10:
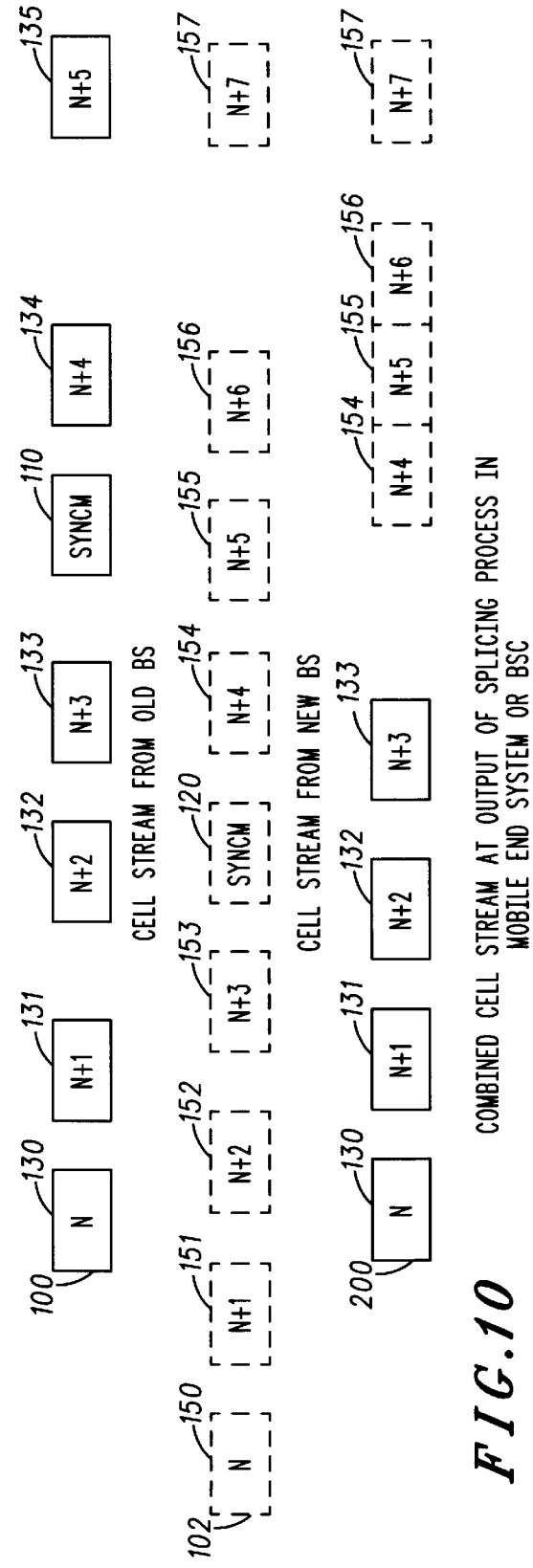
FIG. 10 is a time sequence diagram illustrating a splicing operation in a second scenario.

Referring to FIG. 10, if synchronization cell 120 ($sync_m$) is received first from cell stream 102 from the new BS 14, then the splicing process stores, in a first-in-first-out (FIFO) fashion, user data cells 154, 155 and 156 (n+4, n+5 and n+6), until the corresponding synchronization cell 110 ($sync_m$) is received from the old BS; at that time, the stored user data cells 154, 155, 156 are removed from the FIFO storage, and become the output of the splicing process; when the FIFO storage becomes empty, then subsequent user data cells 157 received from the new BS become the output of the splicing process.

Cells may need to be removed from the FIFO storage at a rate which is paced by the peak cell rate, sustainable cell rate or available cell rate.

Figure 11:
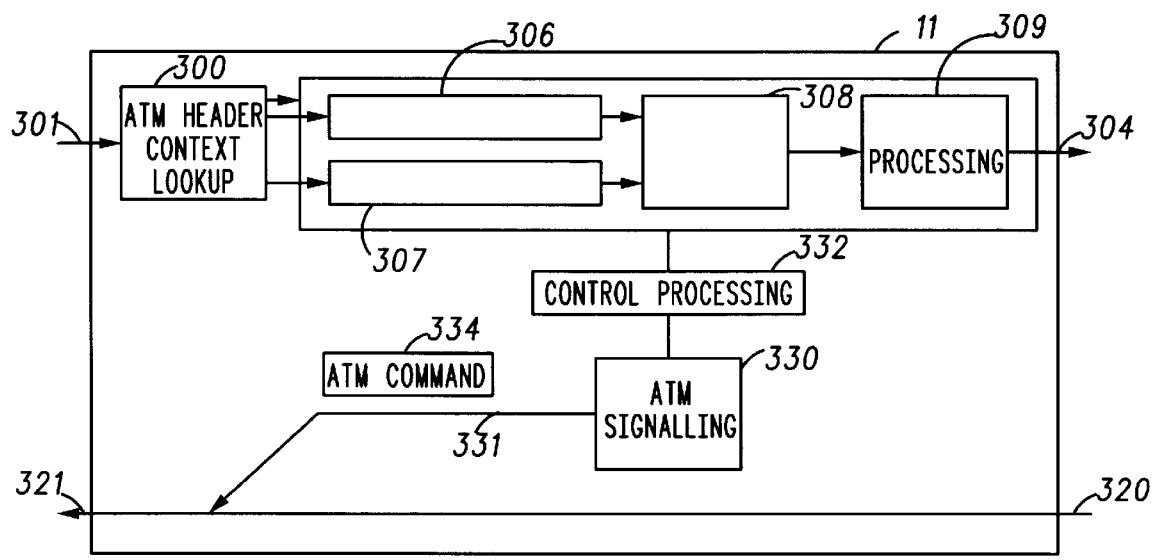
FIG. 11 is a block diagram of a BSC in accordance with one aspect of the invention.

Referring now to FIG. 11, details of a BSC 11 (or 12) are shown. The BSC comprises an ATM switch 300 having input port 301 arranged to receive virtual connections 42, 51 and 62 (and the downlink part of connection 40) from node 21 of the ATM network 20 (these virtual circuits being bundled by node 21 over the same virtual path). It has combiner 303 coupled to switch 300 and an output port 304 for coupling to node 21 (or to some other node in the sub-network on the fixed side). Combiner 303 comprises buffers 306 and 307, splicing element 308 and processor 309. The BSC 11 also has an input port 320 for coupling to node 21 (or to some other node in the fixed end system subnetwork) coupled to an output port 321 for coupling to node 21 or some other node in the sub-network on the mobile side. In addition it has ATM signalling circuit 330 having an output 331 coupled to output port 321 and it has control processing element 332 coupled to the combiner 303 and the ATM signalling circuit 330 for control of those elements.

In operation, the scenario will be considered where a BS-to-BS handover is in progress at the stage shown in FIG. 3. Virtual connection 42 from base station 13 and virtual connection 51 from base station 14 are received on port 301 (together with the downlink part of connection 40 which need not be considered). ATM cells of connections 40 and 51 are presented at port 301 with the same virtual path numbers. ATM switch 300 separates these cell streams by their different VCIs and passes them to buffers 306 and 307. One of buffers 306 and 307 acts as a FIFO to buffer up cells arriving from the new base station (over connection 51) when the synchronization cell 120 arrives from connection 51 before the synchronization cell 110 from connection 40. Processor 309 removes the synchronization cells 110 and 120 and performs the other operations of the splicing process described above, including the control of the rate of removal of the cells from the buffers 306 and 307.

For the downlink direction, ATM signalling circuit 330 issues ATM commands 334 and inserts these into the downlink connection to the ATM network node 21. These messages include messages to: (a) establish new connections; (b) add new legs to existing connections; (c) remove legs from existing connections and (d) drop connections. Thus ATM signalling circuit 330 issues an instruction to node 21 to add leg 50 to existing connection 41.

Thus it has been described how existing point-to-multipoint and point-to-point unidirectional ATM connection configurations are used in a novel way, along with standardized connection control signalling procedures, to transport a bifurcated ATM cell stream during a handoff. Existing, standardized, operations and maintenance (OAM) cell formats and procedures are extended to synchronize the handoff such that duplication and misordering are prevented, and loss is avoided. For real-time service categories, the synchronization procedures provide compensation of differential delay between the old path of the virtual connection and the old path of the virtual connection so that CDV objectives can be met.

The arrangement has the advantages that: cells are not duplicated or misordered during handoff; for non-real time services, cells are not discarded if buffers are dimensioned properly; for real time services, CDV objectives are met, or cells are discarded; further, if sufficiently conservative CDV objectives are set, cell discard does not occur; the path of a connection follows a spanning tree from the anchor BSC to the mobile end system; thus, the number of connection segments (and the corresponding resources) is minimal; standardized ATM layer and ATM signalling protocols are built upon but not modified.

In this manner, combining of virtual circuits on the uplink and bifurcating of virtual circuits on the downlink is achieved.

The above description has set out the elements of the network infrastructure and their operation. The features of the mobile station 30 and the novel air interface between the mobile station 30 and its base station are now described.

Figure 12:
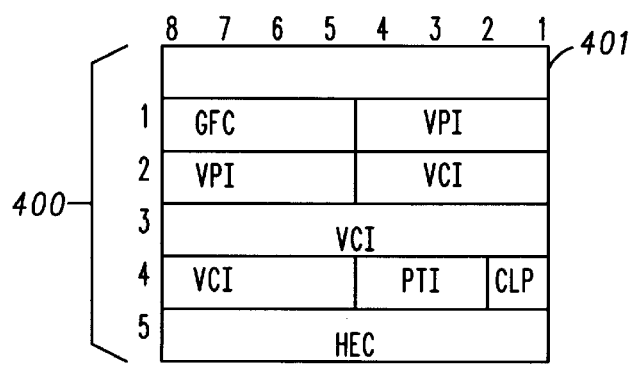
FIG. 12 is a bit map diagram of an ATM header with physical layer information added.

It has been described that in the radio interface physical layer the radio channel is divided into frames, each frame comprising a fixed number of cells and each Nth cell being a synchronization cell (where 10<N<50). FIG. 12 shows a bit map for the header of a cell, whether this is a data cell or a synchronization cell. ATM cell header part 400 comprises 5 octets. Four bits are for generic flow control, eight bits are for VPI, 16 bits are for VCI, 3 bits are for payload type identifier, one bit is for cell loss priority and one octet is for header error control. It can be seen that the VPI and the VCI are a fixed resource. There is a need to make efficient use of this resource. The PTI field identifies, among other things, whether the cell is a synchronization cell or some other cell type.

Added to the ATM cell header part 400 is a physical layer part 401. Physical layer part 401 is shown as comprising only one octet, but may be longer. For present purposes, it is illustrated as having sufficient space for a cell sequence number of 8 bits.

The header shown in FIG. 12 accompanies a payload of 48 octets. This is fixed in the ATM network but may have a trailer added in the physical layer, for example giving extra cyclical redundancy checking or other error control code.

As an alternative arrangement to that illustrated in FIG. 12, physical layer header 401 is omitted and a cell sequence number is inserted in the ATM header 400 in place of some of the fields shown. For example, the GFC field can be omitted and the four bits of this field together with four bits of the VPI field (or four bits of the VCI field) can be used as a sequence number field. The sequence number field is preferably large enought to span several blocks of cells. If, for example, the block size is 64 cells, an 8-bit sequence number field spans 4 blocks before it has to repeat. By providing a block sequence number in each block, these two numbers together uniquely identify a cell over a very large number of cells.

Figure 13:
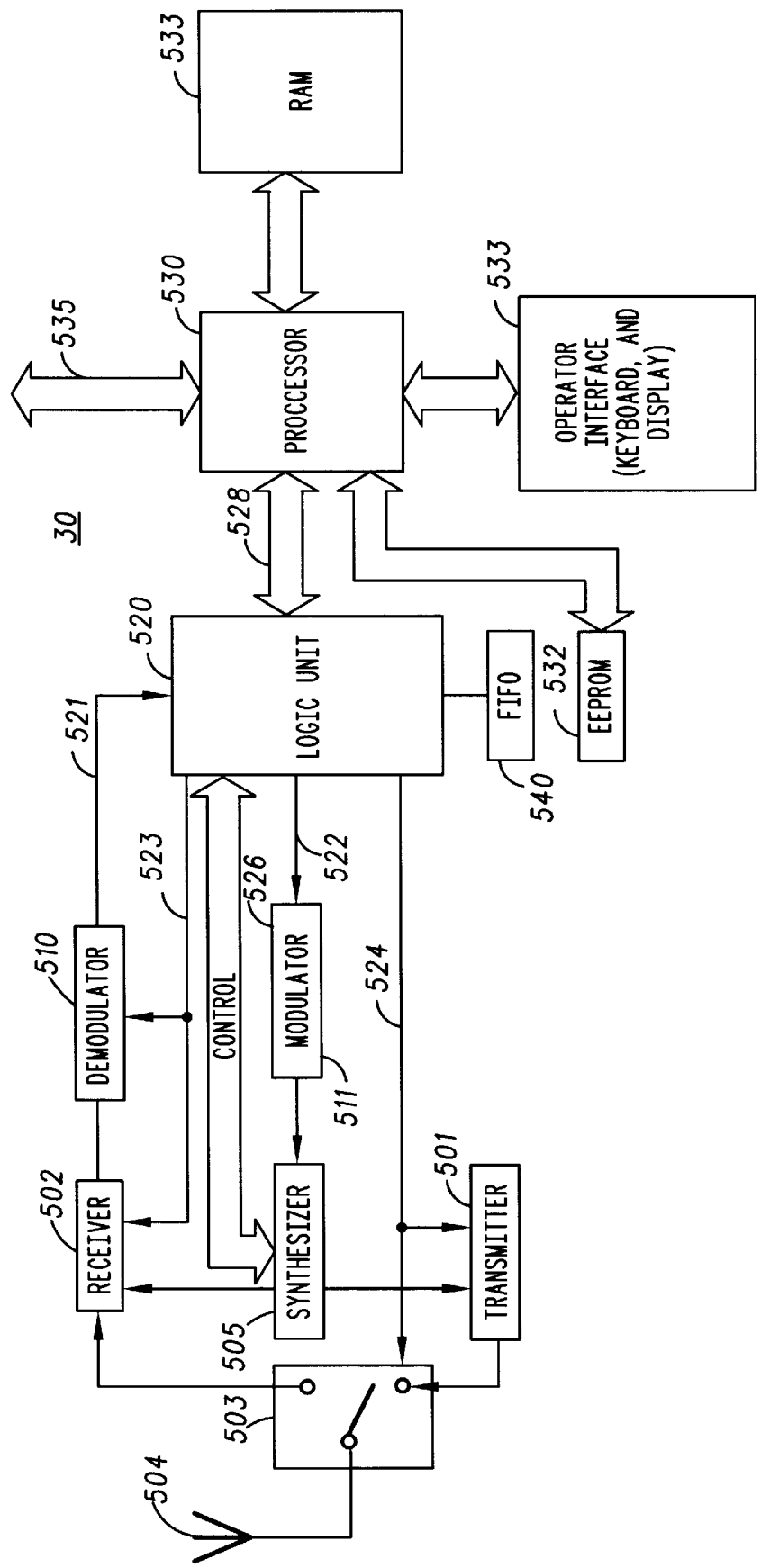
FIG. 13 is a block diagram of a mobile station.

Referring to FIG. 13, elements of an example of a mobile station 30 in accordance with an aspect of the present invention are shown. The mobile station comprises a transmitter 501 and a receiver 502 coupled to an antenna switch 503 and, through the antenna switch, to an antenna 504. A synthesizer 505 is coupled to each of the receiver 502 and the transmitter 501. A demodulator 510 is coupled to receiver 502. A modulator 511 is coupled to the synthesizer 505. A logic unit 520 is coupled via data lines 521 and 522 to the demodulator 510 and modulator 511, respectively, and is coupled by control lines 523 and 524 to the demodulator 510 and the receiver 502 and to the transmitter 501 and the antenna switch 503 respectively. A control bus 526 is coupled between the logic unit 520 and the synthesizer 505. Synthesizer 505 and control bus 526 are optional, as it is not necessary for the mobile station to perform FDMA channel changing, nor is it necessary to perform CDMA spreading and despreading. Instead of an antenna switch 103, a duplexer can be used, allowing simultaneous receiving and transmitting of ATM cells. Logic unit 520 has an associated FIFO buffer 540.

Coupled to the logic unit 520 via a digital bus 528 is a processor 530. Coupled to the processor 530 is a random access memory (RAM) 531, a program memory in the form of electrically erasable programmable read-only memory (EPROM) 532, an operator interface 533 such as a keyboard and display and an I/O interface 535.

In operation, the logic unit 520 receives data for transmission from the processor 530 and generates ATM cells. The ATM cells are created by assigning an ATM header to each cell comprising a virtual path identifier and virtual circuit identifier for the particular transmission. Logic unit 520 adds a physical layer header (and trailer if required) providing a sequence number for each sequential cell and supplies the resultant transmission burst data to modulator 511. It will, of course, be appreciated that alternative arrangements can be provided. For example the addition of the physical layer header and trailer, can be carried out in processor 530.

The logic unit 520 passes the transmission burst data to the modulator 511 bit-by-bit and provides a transmitter key-up signal on control line 524 (at the same time switching antenna switch 503 to the lower position as shown). The logic unit 520 controls the timing of key-up of the transmitter 501, so that each transmission burst is transmitted at a carefully selected time in a frame.

When the transmitter 501 is not keyed up for transmission, the control line 524 causes the antenna switch 503 to switch to the upper position as shown, allowing ATM cells (with physical layer header and trailer) to be received via the antenna 504 to the receiver 502 and demodulated by the demodulator 510 and passed to the logic unit 520.

The received ATM cells are identified in the logic unit 520 by the virtual path and virtual circuit identifier in the header 400 and only cells received with the appropriate virtual path and virtual circuit identifier are selected by the logic unit 520 for further processing. Logic unit 520 orders the received ATM cells in the correct order as defined by the sequence numbers in the physical layer headers 401. Logic unit 520 also performs error correcting in a manner known in the art. When the data has been corrected, the data is passed on to the processor and to the upper layers of the protocol.

The processor 530 can perform the operation of assembling and ordering the ATM cells and can perform the error correcting if desired, but these functions can generally be performed more quickly in the logic unit 520.

Logic unit 520 provides wake-up signals over control line 523 to receiver 502 (and to other parts of the mobile station) causing receiver 502 to power up and power down. Powering up and down of a receiver in response to a signal is readily understood by one skilled in the art and details such as an electronic switch and a battery power source need not be described here.

Logic unit 520 also controls synthesizer 505 via control bus 526 to select appropriate frequencies for transmission and reception depending on the particular frequencies of the system and the modulation scheme and other aspects of the physical layer.

Figure 14:
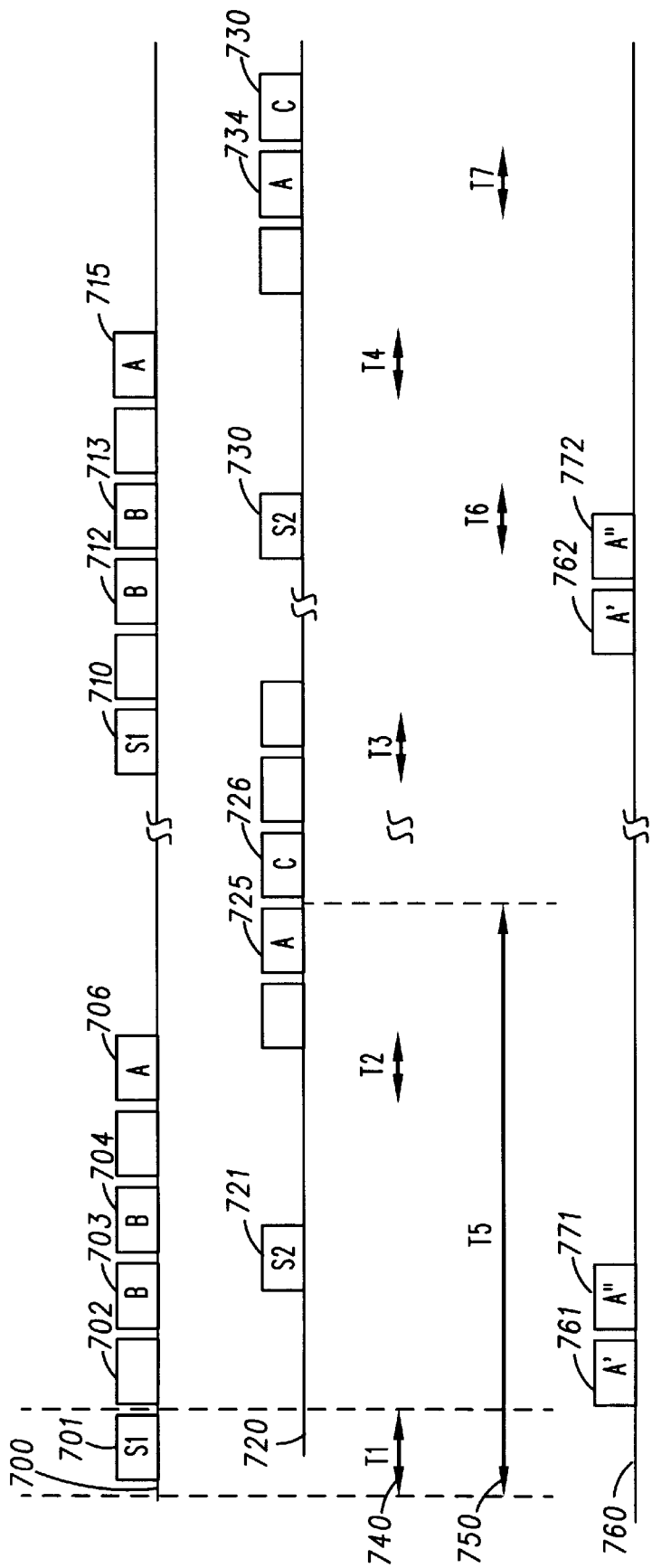
FIG. 14 is a flow diagram illustrating operations performed by the mobile station of FIG. 13.

FIG. 14 is a timing diagram for the purposes of illustrating operation of the mobile station 30 of FIG. 13. In the upper part of the diagram there is a cell stream 700 which is the activity in real time on the downlink of the first ATM radio channel 31. The cell stream 700 comprises a number of transmission bursts 701, 702 etc., each burst comprising one ATM cell with its radio interface header and trailer.

For the purposes of illustration, the first burst 701 shown comprises a synchronization cell S1. This is a physical layer synchronization cell, distinct from synchronization cells 110 and 120 of FIGS. 9 and 10 which are ATM layer synchronization cells. This burst 701 and later synchronization cell burst 710 are separated by one frame of N ATM cell bursts 702, 703 etc. (the diagram is not to scale, as there is a discontinuity shown between ATM cell burst 706 and synchronization cell burst 710). In the example illustrated, bursts 706 and 715 contain cells having the same VPI and VCI (connection A) and bursts 703, 704, 712 and 713 contain cells having another VPI and VCI (connection B). One of these cells may be ATM layer synchronization cell 110.

Below cell stream 700 is illustrated cell stream 720. Cell stream 720 is the activity in real time on the downlink of the second ATM radio channel 32 and comprises physical layer synchronization cell bursts 721 and 730 marking the frames on the physical channel. These are separated by the same frame length (N cells). Bursts 726 and 735 show another independent connection on the channel (connection C). Bursts 725 and 734 show that the ATM cells of connection A are being received on this physical channel. Note that the frequency and bandwidth of this channel are the same as the frequency and bandwidth of the physical channel supporting cell stream 700. Note also that there is not necessarily any code-divided spreading of the different physical channels. The two channel are able to co-exist by virtue of careful selection by each base station-mobile station pair of time slots that are available for that pair.

Thus, for example, connection C in cell stream 720 is established during gaps in the cell stream 700. Connection A over cell stream 700 is also established during gaps in cell stream 700. Synchronization cell bursts 721, 730 in cell stream 720 are shown as coinciding with cell bursts 703, 704 etc. because it is wholly possible that bursts 721, 730 etc. do not interfere with the mobile station communicating over bursts 703, 704 etc. by virtue of the location of that mobile station and its power selection.

Time lines 740 and 750 show wake-up times for mobile station 30. Before the handoff, logic unit 520 of mobile station 30 is powering up its receiver 502 over control line 523 during time periods T1, T2, T3 and T4—that is to say only at times coinciding with bursts in the frame relevant to the mobile station 30 (in particular ATM cell bursts for the connection supported and synchronization cell bursts for the physical channel).

When a handoff conditions are met, i.e. handoff is perceived as available or a command is received from the communicating base station requiring a handoff, the logic unit 520 of the mobile station 30 powers the receiver 502 up by providing a signal over control line 523 for a longer time period T5 sufficient to encompass the arrival of synchronization cell burst 721 of cell stream 720 and ATM cell burst 725 of the connection supported. Thereafter it can power down until the next following synchronization cell burst 730 of the new base station cell stream 720. Other arrangements can be envisaged where the mobile station extends its receiver wake-up time during the handoff and reduces it when synchronization of the cell streams is complete. At a minimum, it must remain in receive mode until synchronization cell burst 721 from the new base station is received.

Thus a method of operation of the mobile station has been described comprising the steps of powering up the receiver 502 during first time periods T1 corresponding to physical layer synchronization cells 701 arriving from the old base station and second time periods T2 corresponding to ATM cells arriving from the old base station, determining that handoff conditions are met and powering up the receiver for a third time period T5 longer than the first and second time periods. The third time period extends at least until a physical layer synchronization cell 721 is received from the new base station and preferably at least until an ATM cell 725 is received from the new base station following the physical layer synchronization cell from the new base station. After a handoff from the first base station to the second base station, the receiver is powered up during fourth time periods (T6 or T7) shorter than the third time period (T5).

Time line 760 illustrates operation of the mobile station 30 in transmission, i.e. the uplink cell stream over the R.F. interface. In transmission, during the handoff, the mobile station simultaneously transmits its uplink cells over the virtual connection to base station 13 and the virtual connection to base station 14. This is achieved in one of two ways.

The first and preferred way is illustrated in FIG. 14 and shows that a cell 761 containing uplink data (or an uplink F5 synchronization cell) is transmitted and after a full frame period, the next cell 762 of the sequence is transmitted. These are marked as connection A' and form the connection to the old base station. As soon as possible after cell 761, the same cell is transmitted but with the VPI and VCI appropriate to the connection to the new base station. This is shown as cell 771, and a frame later the next subsequent cell 772 is transmitted. Thus there is duplication of the transmission of the cell payload, with different headers. Note that the locations of cells 761 and 771 are selected according to the activity on the uplink channel (which preferably has a different frequency band to the frequency band of the downlink channel but could indeed share the same frequency band). Note also that the timing of transmission of the uplink cells is selected so as not to coincide with the corresponding cells on the two downlink channels represented by cell streams 700 and 720. This is advantageous for antenna switching and receiver sensitivity reasons.

The second way of simultaneously transmitting uplink cells over the virtual connections to the two base stations is by selecting the VCI and VPI for the new uplink connection as being the same as the VPI and VCI for the existing uplink connection and transmitting each cell only once. In this scheme, commands 77 and 78 of FIG. 7 do not require the establishment of a new connection, but command 77 merely informs the mobile station of the acceptance of the cells by the base station and command 78 is an acknowledgement. As one of the final steps of this handoff process, the VPI number can be changed to a new VPI number selected by the new base station.

Figure 15:
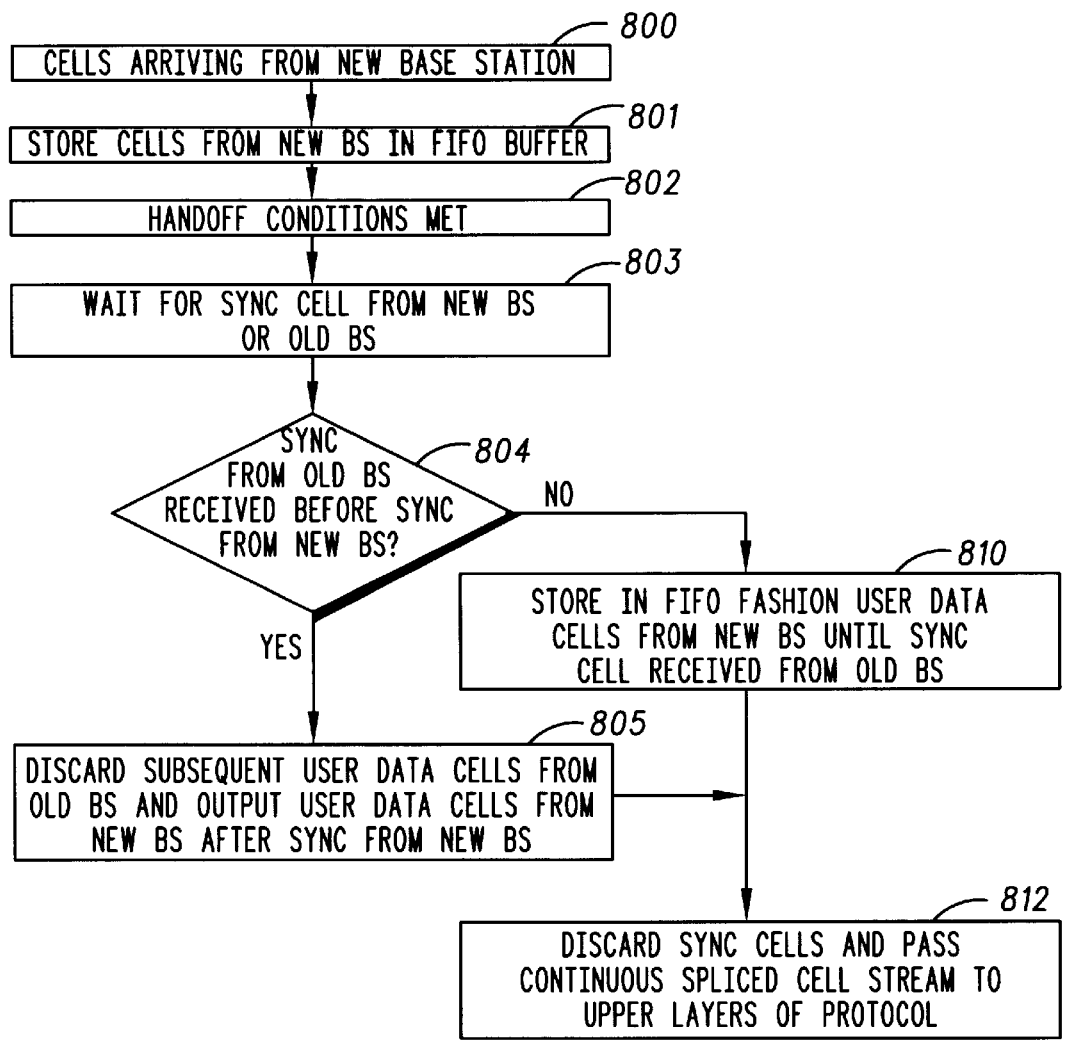
FIG. 15 is a timing diagram illustrating power saving features of the mobile station of FIG. 13.

FIG. 15 is a flow diagram illustrating a splicing process performed by the logic unit 520 of the mobile station 30 of FIG. 13. In step 800, the step in the handoff process has been reached at which duplicate cells are arriving at the mobile station 30 relating to the same communication, but arriving from different base stations in a manner the same as has been described with reference to the cell streams arriving at the BSC as illustrated in FIG. 8. Received physical layer synchronization cells are discarded. In step 801, cells from the new base station are stored in FIFO buffer 540. When handoff conditions are met (step 802), the mobile station 30 waits for the next (or first) ATM synchronization cell (similar to cell 120 in FIG. 8 but this time received over the air within one of cell bursts 725, 734 etc.) from the new base station (step 803). If in step 804 the ATM synchronization cell first arrives from the old base station (as in FIG. 9), step 805 discards subsequent user data cells from the old base station and outputs to the higher layers of the protocol the user data cells from the new base station after synchronization with the new base station. Otherwise (step 810) user data cells from the new base station are stored in FIFO buffer 540 until the next ATM synchronization cell (similar to cell 110 in FIG. 8) is received from the old base station, in a manner similar to that shown in FIG. 10. Eventually (step 812) the ATM synchronization cells are discarded and the resulting continuous spliced cell stream is passed to the upper layers of the protocol and eventually to an application layer where the data is output to the user through operator interface 533 as voice or message text or video or in whatever form the application dictates or it is passed on to some other device over interface 535.

The splicing process can be modified to include synchronization so that it supports real-time service categories. Each node in the ATM virtual connection, the base station and the BSC(s) are required in the standard ATM architecture to determine the maximum CDV that it will insert in the connection (its CDV allocation). This requirement is extended to also require a CDV allocation for the synchronization process, to be included in the CDV allocation of the BSC or mobile station in which the synchronization process resides. Further, the standardized ATM connection control architecture allows the BSC to determine the largest cumulative CDV that could be inserted by those nodes upstream of itself.

Figure 16:
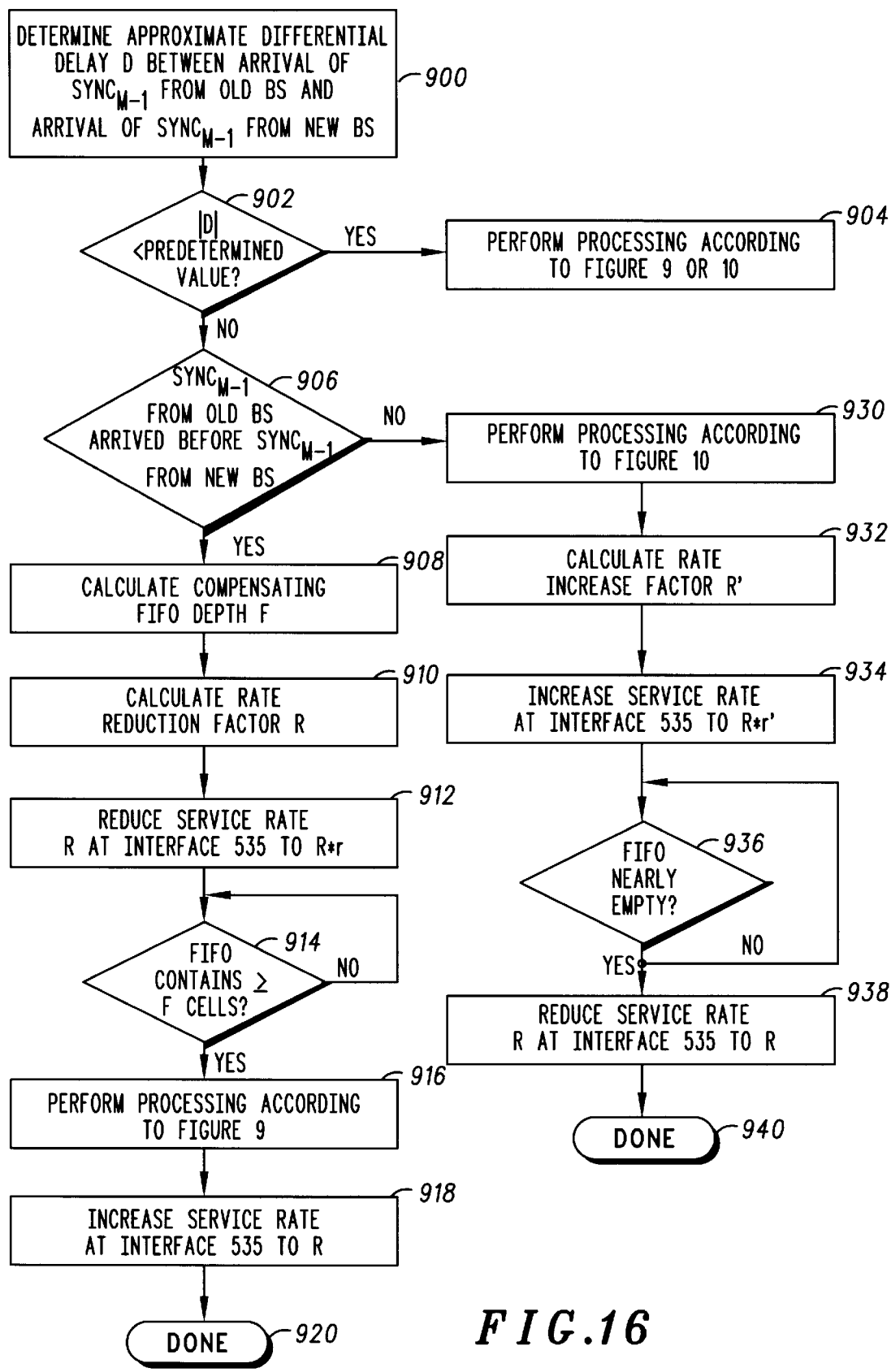
FIG. 16 is a flow diagram showing further operations performed by the mobile station of FIG. 13.

FIG. 16 and the following description describes further details of the splicing process performed in the logic unit 520 (or the processor 530) in the mobile station 30. Similar processing is performed in the BSC 11 (or 12).

For real time service categories, the logic unit 520 and the processor 530 between them control the rate R at which ATM cells are transferred across the interface 535. The rate R is ordinarily determined at connection establishment time using information contained in the standard connection control signalling messages. If ATM cells arrive at the logic unit at a rate faster than R, then the cells are stored in FIFO 540 (or in RAM 531) until they are able to be consumed at the interface 535.

Referring to FIG. 16, the approximate differential delay D between the communication from the old BS and the communication from the new BS is measured in step 900 by determining the time between the arrival of a sync cell $sync_{m-1}$ from the old BS and the corresponding arrival of $sync_{m-1}$ from the new BS. If (step 902) the absolute value of D is less than a predetermined delay value, then the splicing process proceeds in step 904 as shown in FIG. 9 or FIG. 10. No further delay compensation is needed.

If step 906 determines that synchronization cell synchm-1 from the old base station arrives before synchronization cell synchm-1 arrives from the new base station, then in step 908 the synchronization process calculates a compensating FIFO depth F for FIFO buffer 540, such that F is a number of cells that need to be stored to allow the handover to take place without exceeding the CDV allocation for the synchronization process. Step 910 then calculates a rate reduction factor r<1, such that R*r allows F cells to accumulate in the FIFO in k blocks. The value of r is further determined such that reducing the service rate in step 912 at interface 535 to R*r will not cause the CDV allocation to be exceeded. Except when D is exceptionally large, r will be equal to 1. When the FIFO contains F cells (step 914), then splicing can proceed as illustrated in FIG. 9 (step 916). At the same time (step 918), the service rate at interface 535 is increased to R and the splicing process is concluded (step 920).

If, in step 906, synchronization cell synchm-1 from the old base station arrives after synchronization cell synchm-1 arrives from the new base station, then synchronization is performed as illustrated in FIG. 10 (step 930). The clustered cells received from the new base station, cells 154, 155, 156, are stored in the FIFO 540. A rate increase factor r' is calculated in step 932 such that increasing the service rate at the interface 535 to r'*R will not cause the CDV allocation for the synchronization process to be exceeded. The service rate at the interface 535 is then increased in step 934 to r'*R. When the FIFO becomes empty (or nearly empty) as determined by step 936, the service rate at interface 535 is reduced again in step 938 to R and the splicing process is concluded (step 940).

Thus a handoff process has been described which comprises combining first and second cell streams in a remote station (mobile station) of a radio communications system, comprising: receiving a first cell stream 700 from a first base station 13, the first cell stream including first synchronization cells (preferably ATM synchronization cells e.g. cell 110, but alternatively physical layer synchronization cells e.g. cell 701); receiving a second cell stream 720 from a second base station 14, the second cell stream including second synchronization cells (preferably ATM synchronization cells e.g. cell 120, but alternatively physical layer synchronization cells e.g. cell 721); outputting the first cell stream until a first synchronization cell is received; receiving a second synchronization cell; and outputting the second cell stream following the second synchronization cell.

The handoff process has significant advantages over soft handoff processes in prior art systems such as CDMA systems, especially where data is conveyed, because it does not rely on correlation of the data content (e.g. voice correlation) but allows seamless splicing of the ATM cells carrying the data and avoids or minimizes data loss or duplication. It also has advantages in systems carrying data where service rate is important, such as video data, as it allows for smooth continuous flow control of the data without jitter.

Modifications of the arrangements described can be made within the scope of the invention. For example it has been described how sequence numbers are provided for individual cells and how sequence numbers are provided in ATM synchronization cells (F5 cells). As an alternative one or other of these sequence numbers can be omitted. Also it has been described how synchronization cell bursts (F3 cells) are provided in the physical layer and ATM synchronization cells (F5 cells) are provided in the ATM layer. In an alternative embodiment only one of these sets of synchronization cells are used.

We claim:

1. A method for handover in a communication system wherein communication between a mobile end system and a base station takes place by utilizing ATM cells transmitted over a common frequency, the communication system having a base station controller coupled to a plurality of base stations through an intervening ATM network so that communication between the base stations and the mobile end system as well as communication between the base stations and the base station controller utilize ATM cells, the method comprising the steps of:

establishing a first point-to-point virtual connection between the base station controller and the mobile end system wherein the first virtual connection is made through a first base station so that communication between the mobile end system to the base station controller utilizes ATM cells transmitted from the base station controller through the intervening ATM network, through the first base station, and to the mobile end system;

establishing a second point-to-multipoint virtual connection having only a first leg between the base station controller and the mobile end system wherein the second point-to-multipoint virtual connection is made through the first base station so that communication between the mobile end system to the base station controller utilizes ATM cells transmitted from the mobile end system to the first base station, through the intervening ATM network, to the base station controller;

establishing a third point-to-point virtual connection between the base station controller and a fixed end system, wherein the third virtual connection is made through the intervening ATM network and utilizes ATM cells transmitted from the base station controller to the fixed end system;

transferring cells received by the base station controller from the fixed end system to the mobile end system via the second point-to-multipoint virtual connection; and transferring cells received by the base station controller from the mobile end system to the fixed end station via the third virtual connection between the base station controller and the fixed end system.

2. The method of claim 1 further comprising the steps of:

determining that a need for a handoff exists; establishing a fourth point-to-point virtual connection between the mobile end system and the base station controller wherein the fourth virtual connection is made through a second base station so that communication between the mobile end system to the base station controller utilizes ATM cells transmitted from the mobile end system to the base station controller through the second base station; and utilizing the second point-to-multipoint virtual connection to establish a second leg of the point-to multipoint virtual connection through the second base station to the mobile end system.

3. The method of claim 2 further comprising the steps of:

dropping the first leg of the second point-to-multipoint virtual connection; and first point-to-point virtual connection.

4. The method of claim 2 further comprising the step of, at the base station controller, synchronizing the first point-to-point virtual connection with the fourth point-to-point virtual connection.

5. The method of claim 2 further comprising the step of, at the mobile end system, synchronizing the first and the second legs of the second point-to-multipoint virtual connection.

* * * * *